United States Patent
Deshpande (10) Patent No.: US 7,272,779 B2
(45) Date of Patent: Sep. 18, 2007

(54) SYNCHRONIZED MUSICAL SLIDESHOW LANGUAGE

(75) Inventor: Sachin Deshpande, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 335 days.

(21) Appl. No.: 10/404,795

(22) Filed: Mar. 31, 2003

(65) Prior Publication Data

US 2004/0199866 A1    Oct. 7, 2004

(51) Int. Cl.
*G06F 15/00*  (2006.01)
(52) U.S. Cl. .................................. 715/500.1
(58) Field of Classification Search ............. 386/96, 386/95; 725/110; 715/500.1, 500
See application file for complete search history.

(56) References Cited

U.S. PATENT DOCUMENTS

| | | | |
|---|---|---|---|
| 5,491,498 A * | 2/1996 | Koyama et al. ............. 345/519 |
| 6,195,692 B1 * | 2/2001 | Hsu ............................. 725/110 |
| 6,393,202 B1 * | 5/2002 | Yamauchi et al. ............. 386/95 |
| 6,526,223 B1 * | 2/2003 | Mori et al. ..................... 386/96 |
| 6,618,550 B1 * | 9/2003 | Ando et al. ..................... 386/95 |
| 6,907,189 B2 * | 6/2005 | Ko et al. ......................... 386/96 |
| 6,976,229 B1 * | 12/2005 | Balabanovic et al. ........ 715/838 |

OTHER PUBLICATIONS

Rangan et al., "Designing File Systems for Digital Video and Audio", 1991, ACM, pp. 81-94.*
Althun, Bjorn, "Multimedia Streaming Services: Specification, Implementation, and Retrieval", ACm, 2003, pp. 247-254.*

* cited by examiner

*Primary Examiner*—Doug Hutton
*Assistant Examiner*—James J. Debrow
(74) *Attorney, Agent, or Firm*—Marger Johnson & McCollom PC (57) ABSTRACT

A method of defining a synchronized slideshow is disclosed. The method includes providing at least one body element of a slideshow, where the body element is at least one selected from a group of a master audio element to allow audio playback with or without synchronized images and a master image element to allow playback of images with a specified timing, the master image element being associated with at least one image element having a location.

2 Claims, 3 Drawing Sheets

SYNCHRONIZED MUSICAL SLIDESHOW LANGUAGE

BACKGROUND

Synchronized Multimedia Integration Language (SMIL, pronounced "smile") allows users to develop and play back interactive, multimedia presentations. SMIL was designed to cater to a wide-range of applications. This is accomplished by a rather complicated and detailed language.

For some applications, such as applications that run on platforms that are not fully functional computers, SMIL may not be suitable. For example, a relatively new line of liquid crystal display (LCD) televisions has become available. It is possible for users to insert memory sticks and cards from such things as digital cameras and camcorders and 'play' their pictures on their television. Users may desire to set these to music, as well as have music from memory play on their television when no images are present. These types of platforms do not have the full functionality of a personal computer and may not be able to use a presentation in SMIL format. For purposes of the discussion here, these types of platforms will be referred to as limited resource platforms. The resources of the platform are not limited for television applications, just for auxiliary applications that are not the main purpose of the platform.

In some instances a presentation may be defined that is beyond the capability of the system. For example, a presentation in SMIL may call for two MP3 (Moving Pictures Experts Group, Layer 3) files to be played back simultaneously. A limited resource platform cannot execute this, making the presentation unexecutable on the platform.

BRIEF DESCRIPTION OF THE DRAWINGS

The invention may be best understood by reading the disclosure with reference to the drawings, wherein.

DETAILED DESCRIPTION OF THE EMBODIMENTS

The Synchronized Multimedia Integration Language, SMIL ("smile), is an XML based language for writing interactive multimedia presentations. SMIL was designed to cater to a wide range of applications, resulting in a highly complex language that is not necessarily suited for embedded devices with specific capabilities. Current SMIL player implementations are largely restricted to PC platforms, or platforms with PC-like capabilities. In addition, using SMIL it is possible to define a presentation which may be beyond the capability of a particular system. As an example using SMIL the following is a simple valid presentation:

```
<smil>
<body>
<par>
<audio src="song1.mp3"/>
<audio src="song2.mp3"/>
</par>
</body>
</smil>
```

However playing back this presentation may be beyond the capability of some systems. The system may not be able to play back two audio files simultaneously because of processing (decoding) capabilites or lack of audio mixing capabilities, as examples.

An embedded device, referred to above, may be a device that is intended for one main use, but offers the ability to play slideshows or other types of presentations as an added feature. This could be any type of device with audio and image capability. For purposes of discussion here, the platform will be discussed in terms of a digital television. This is only intended for ease in understanding embodiments of the invention and is not intended in any way to limit the scope of the claims.

Figure 1:
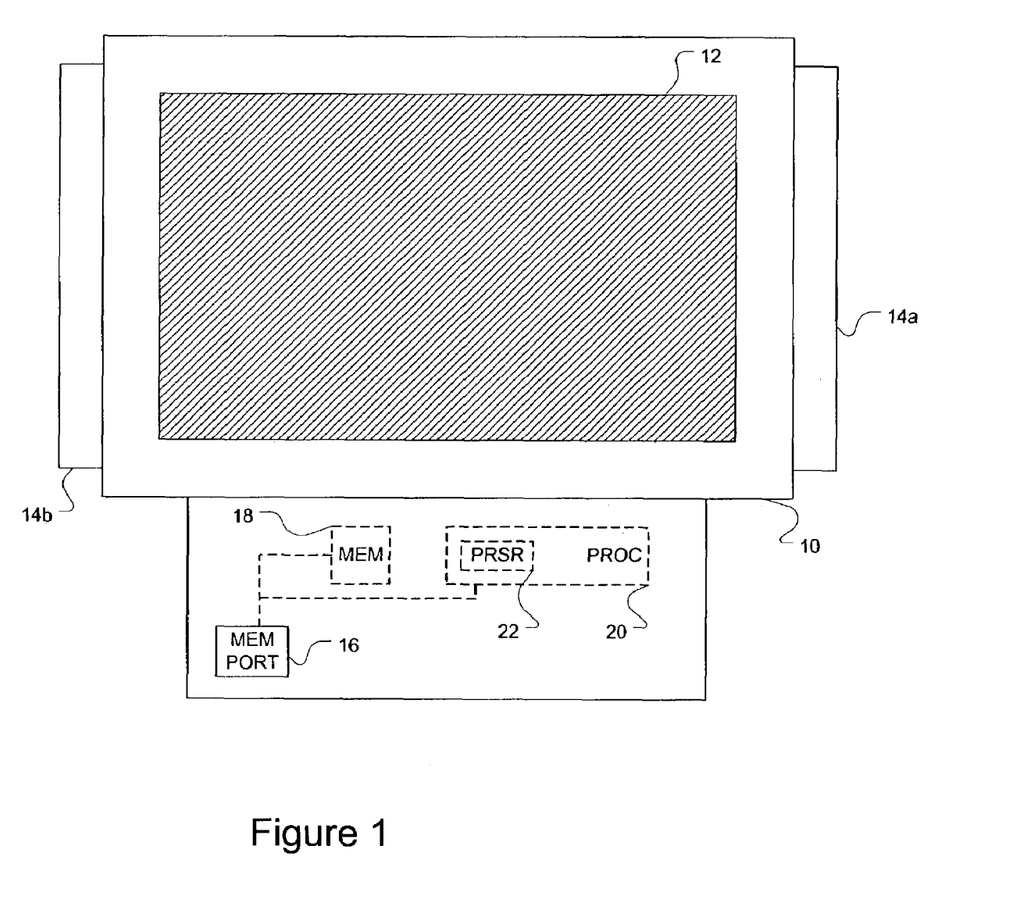
FIG. 1 shows an embodiment of a device to execute synchronized musical slideshow instructions to produce a synchronized musical slideshow.

FIG. 1 shows an embodiment of a device with audio and image display capabilities, in the form of a digital television, such as a liquid crystal device (LCD) television. Other examples include portable display devices such as portable televisions, DVD players, even handheld devices such as personal digital assistants. The device 10 has a screen 12 upon which can be displayed images, either still images or video images. Audio output is provided in this embodiment by speakers 14*a* and 14*b*, but could be any type of audio output such as a headset, or even just a jack that allows the system to be connected to speakers, a headset or a stereo system.

Typically, a user initiates a slideshow or other display of still images by inserting a memory stick or card from a digital camera into a port located on the device. In the example of FIG. 1, the memory port 16 would allow the user to insert memory that may contain the images, audio files and possibly even the instructions that, when executed, would cause the device to produce the slideshow. A memory stick or a card are only examples of machine-readable media that could contain these instructions. Other possibilities include a connector that would allow the images from a camera, or music from an MP3 player, to be downloaded into the memory 18, that resides internally in the device 10. Other possibilities include images and music obtained in real-time from networksuch as home networks or the Internet. Even more possibilites include diskettes, compact discs, digital video discs, etc. Some implementations may include an article of machine-readable media, such as those listed above, that contain instructions that, when executed, cause the machine to perform the methods discussed in the embodiments of the invention.

Similarly, the instructions may reside on the internal memory 18, if it exists. Some devices may utilize the memory provided by the user in removable form to provide the slideshow functionality. Alternatively the user may store the instructions on one part of the memory, such as internal memory 18, and the source files of images and audio on the removable memory. In either case, the processor 20 that resides in the device 10 will access the instructions and the source files from either or both of the memories to produce the slideshow. The instructions may also be automatically generated using available information about the media files (images, music), for example from a memory stick. This will be referred to as producing the slideshow "on the fly."

The synchronized musical slideshow language (SMSL) of the embodiments of the invention is also an XML based language, similar to SMIL. Therefore a processor, such as processor 20 may include within it an XML parser 22. The XML parser may be embodied in code being executed by the processor, may be a reserved part of the processor, or it may be a separate processor, such as a digital signal processor, as examples.

The synchronized musical slideshow language allows a user to show zero or more images by themselves or synchronized with audio. The following table illustrates various elements of the language:

| | |
|---|---|
| Document structure elements | synchshow, head, body |
| Head elements | Metadata |
| Body elements | masteraudio, masternone |
| Image object element | image |

Each synchronized slide show, or 'synchshow,' document is a sequence of zero or one head and body elements. The head element consists of zero or more metadata elements that have a name and a value pair as its attributes. In XML an element is a structure that surrounds a particular item in an XML file. The element typically describes the nature of the content they surround. The beginning of an element is typically identified by a "<" and a closing of the element by a "/>." Attributes are name-value pairs that define some portion of the element. For example, a name value pair may be filename="myfile". In that name-value pair, the name of the item inside the element is "filename" and the value of the filename is "myfile."

Elements and attributes are defined in a either a XML schema, which describes and validates data in an XML environment by defining relationships between data types, or a Document Type Definition (DTD), which defines tags and attributes, locations allowed by tags, and the nesting properties of tags. An example of a DTD for SMSL is discussed below. SMSL has two main elements: the head element, discussed above; a body element. The body element consists of a sequence of zero or more masteraudio and masternone elements. The masteraudio and masternone elements consist of a sequence of zero or more image elements. The masteraudio element allows the device to display images synchronized with the audio or to playback audio by itself without any synchronized images. The masteraudio element may also be referred to as a master audio element. The masternone element can be used to display images according to specified timings but without any synchronized audio. The masternone element may also be referred to as a master image element.

Figure 2:
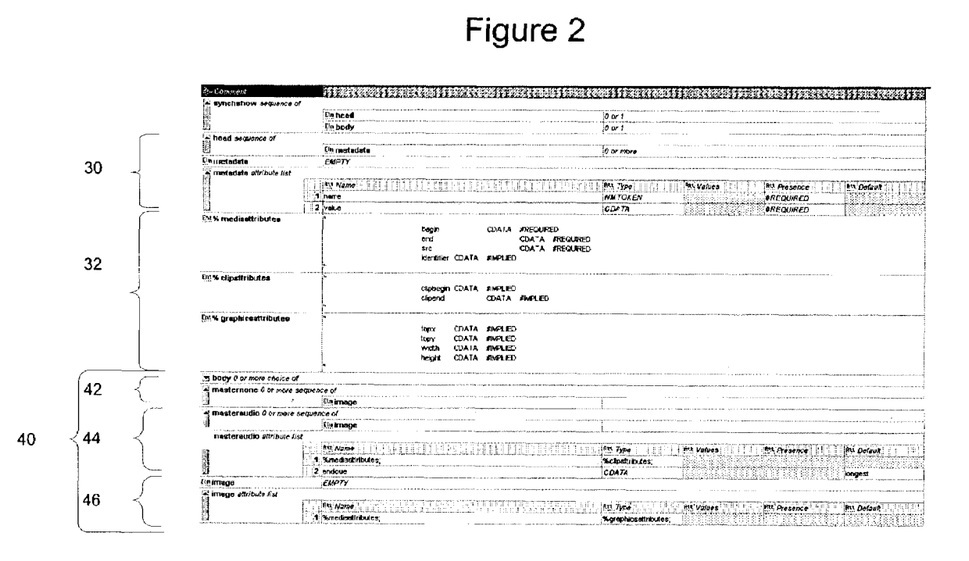
FIG. 2 shows an embodiment of a method to define a synchronized musical slideshow.

The masteraudio element can have media attributes, clip attributes and an endcue attribute which has a default value of longest, where the other possible value being the shortest. The image element can have media attributes and graphics attributes. In contrast to the SMIL language there is no separate layout element defined. Instead each image element has graphics attributes which allow its placement to any desired location. A detailed diagram illustrating the structure of a synchshow document is shown in FIG. 2. This is followed by the XML DTD and XML Schema definition of the synchronized musical slideshow language.

In FIG. 2, the head element 30 consists of the head element and metadata. 32 consists of entities for the attributes of media, clip and graphics. For example, it can be seen that the media attributes include the attributes of: begin; end; src (source); and identifier. In accordance with XML structures, the CDATA attributes are typically character data. Some of the CDATA attributes have #REQUIRED values, meaning that an explicitly specified value for the attribute must be included for every occurrence of the element in the document. Others have #IMPLIED values, which means that the attribute does not have to be included and no default value is provided.

The body element 40 has three parts: a master none or master image element 42; a master audio or master media element 44; and an image element 46. It should be noted that the master audio element does not actually have to refer to an audio element. It could refer to any type of media, such as a video, but is referred to as audio to differentiate it from the master image element. The slideshow file format shown in FIG. 2 is defined in either a DTD or an XML Schema. Examples of these are shown below.

XML DTD

```
<!ELEMENT synchshow (head?, body?)>
<!ELEMENT head (metadata*)>
<!ELEMENT metadata EMPTY>
<!ATTLIST metadata
  name NMTOKEN #REQUIRED
  value CDATA #REQUIRED
>
<!ENTITY % mediaattributes "
    begin     CDATA #REQUIRED
    end       CDATA #REQUIRED
    src       CDATA #REQUIRED
    identifierCDATA #IMPLIED
">
<!ENTITY % clipattributes "
    clipbegin  CDATA #IMPLIED
    clipend    CDATA #IMPLIED
">
<!ENTITY % graphicsattributes "
    topx     CDATA #IMPLIED
    topy     CDATA #IMPLIED
    width    CDATA #IMPLIED
    height   CDATA #IMPLIED
">
<!ELEMENT body (masteraudio | masternone)*>
<!ELEMENT masternone (image)*>
```

-continued

```
<!ELEMENT masteraudio (image)*>
<!ATTLIST masteraudio
  %mediaattributes; %clipattributes;
  endcue CDATA "longest"
>
<!ELEMENT image EMPTY>
<!ATTLIST image
  %mediaattributes; %graphicsattributes;
>
```

XML Schema

```
<?xml version="1.0" encoding="UTF-8"?>
<!--W3C Schema generated by XML Spy v4.3 U (http://www.xmlspy.com)-->
<xs:schema xmlns:xs="http://www.w3.org/2001/XMLSchema" elementFormDefault="qualified">
    <xs:element name="body">
        <xs:complexType>
            <xs:choice minOccurs="0" maxOccurs="unbounded">
                <xs:element ref="masteraudio"/>
                <xs:element ref="masternone"/>
            </xs:choice>
        </xs:complexType>
    </xs:element>
    <xs:element name="head">
        <xs:complexType>
            <xs:sequence>
                <xs:element ref="metadata" minOccurs="0" maxOccurs="unbounded"/>
            </xs:sequence>
        </xs:complexType>
    </xs:element>
    <xs:element name="image">
        <xs:complexType>
            <xs:attribute name="begin" type="xs:string" use="required"/>
            <xs:attribute name="end" type="xs:string" use="required"/>
            <xs:attribute name="src" type="xs:string" use="required"/>
            <xs:attribute name="identifier" type="xs:string"/>
            <xs:attribute name="topx" type="xs:string"/>
            <xs:attribute name="topy" type="xs:string"/>
            <xs:attribute name="width" type="xs:string"/>
            <xs:attribute name="height" type="xs:string"/>
        </xs:complexType>
    </xs:element>
    <xs:element name="masteraudio">
        <xs:complexType>
            <xs:sequence minOccurs="0" maxOccurs="unbounded">
                <xs:element ref="image"/>
            </xs:sequence>
            <xs:attribute name="begin" type="xs:string" use="required"/>
            <xs:attribute name="end" type="xs:string" use="required"/>
            <xs:attribute name="src" type="xs:string" use="required"/>
            <xs:attribute name="identifier" type="xs:string"/>
            <xs:attribute name="clipbegin" type="xs:string"/>
            <xs:attribute name="clipend" type="xs:string"/>
            <xs:attribute name="endcue" type="xs:string" default="longest"/>
        </xs:complexType>
    </xs:element>
    <xs:element name="masternone">
        <xs:complexType>
            <xs:sequence minOccurs="0" maxOccurs="unbounded">
                <xs:element ref="image"/>
            </xs:sequence>
        </xs:complexType>
    </xs:element>
    <xs:element name="metadata">
        <xs:complexType>
            <xs:attribute name="name" type="xs:NMTOKEN" use="required"/>
            <xs:attribute name="value" type="xs:string" use="required"/>
        </xs:complexType>
    </xs:element>
    <xs:element name="synchshow">
        <xs:complexType>
            <xs:sequence>
                <xs:element ref="head" minOccurs="0"/>
                <xs:element ref="body" minOccurs="0"/>
            </xs:sequence>
        </xs:complexType>
    </xs:element>
</xs:schema>
```

Figure 3:
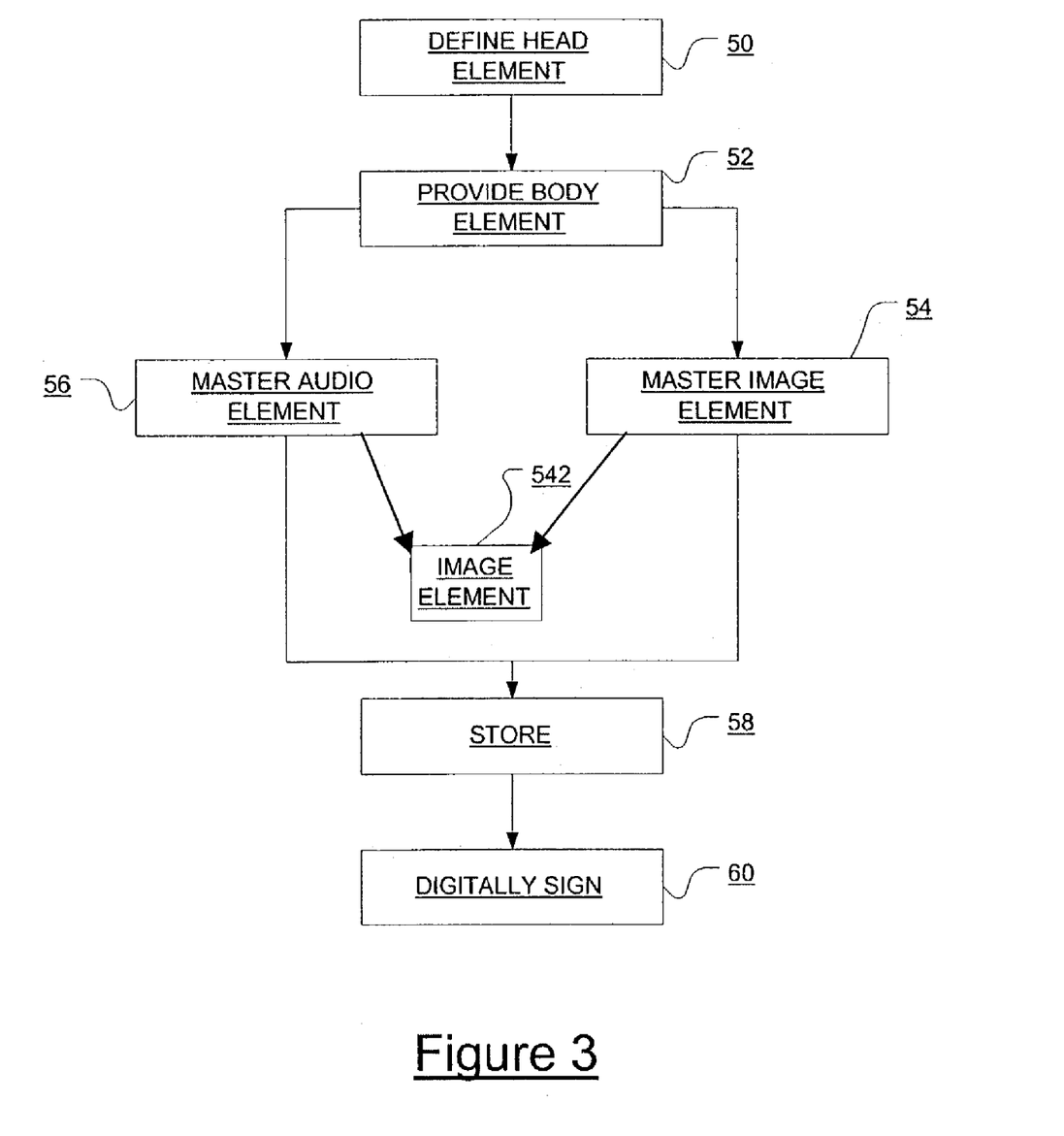
FIG. 3 shows an embodiment of a synchronized musical slideshow format.

The DTD/Schema shown in FIG. 2 was provided by an XML authoring tool called XML Spy™. SMSL is capable of executing a synchronized slideshow (synchshow) that is produced to conform to the SMSL DTD or schema. The process for producing slide shows in accordance with these is shown in FIG. 3, whether an authoring tool is used, or if the user manually writes the tags, elements and attributes in a text file.

At 50, the head element is defined. It is possible that head elements may not be required, as the head element serves to identify the slideshow. Some implementations may use the file name to do so, rendering the head element unnecessary for that purpose. The head element may be used for other types of metadata, and will typically be included. Similarly, at 52, while the DTD states that there may be zero or more body elements, a slideshow without any body elements is not really a slideshow, but an empty file. Therefore, at least one of either a master audio element 56, or a master image element 54, is necessary to define a meaningful slideshow. The master image element (masternone), if used, will typically be associated with an image element 542, as mentioned with regard to FIG. 2. Similarly master audio element 56 may be associated with zero or more image elements 542.

While it is not necessary, if on-board slideshow creation is available to the device, the slideshow will typically be stored at 58. It is possible in some XML authoring tools to digitally sign the slideshow file at 60 to prevent any alteration of it. This may be useful to prevent someone from violating a copyright of another's slideshow. These last two are both optional parts of the process.

Having discussed the overall scheme and/or DTD for a slideshow file, it is helpful to see a possible slideshow example, written using the SMSL.

---

Slideshow

```
<?xml version="1.0" encoding="UTF-8"?>
<!DOCTYPE synchshow SYSTEM "synchshow3.dtd">
<synchshow>
    <head>
        <metadata name="Author" value="John Doe"/>
    </head>
    <body>
        <masteraudio src="music1.au" begin="5" end="30">
            <image src="img1.jpg" begin="5" end="19"/>
            <image src="img2.jpg" begin="20" end="30"/>
        </masteraudio>
        <masternone>
            <image src="img2.jpg" begin="100" end="117"/>
            <image src="img3.jpg" begin="118" end="125"/>
        </masternone>
        <masteraudio src="music1.au" begin="34" end="80">
        <image src="img1.jpg" begin="34" end="50" topx="10" topy="10"
width="320" height="240"/>
            <image src="img2.jpg" begin="51" end="70"/>
            <image src="img3.jpg" begin="71" end="80"/>
        <masteraudio/>
    </body>
</synchshow>
```

---

The slideshow starts with a music file being played from 5 to 30 seconds, which is on the timeline for the overall presentation. There is an attribute clipbegin and clipend that use the timeline of the clip, which is not to be confused with the presentation timeline. For example, a clip may have 40 seconds, and specifying that the clipbegin time is 10 seconds would mean that the clip starts 10 seconds into the clip, not that the clip begins 10 seconds into the slideshow. Returning to the example above, the first image is displayed from 5 to 19 seconds and then a second image is displayed from 20 to 30 seconds. The second image will no longer be displayed as the audio clip ends.

The attribute endcue mentioned above, allows the slideshow to adapt for images or sound files that are not played to the same time. For example, the file could list the end for the audio file at 28 seconds, while the image is to be displayed until 30 seconds. The endcue attribute for masteraudio being defined as 'longest' would cause the image file to be displayed until 30 seconds. If the endcue attribute for masteraudio were defined as 'shortest' the image would be only displayed until 28 seconds.

Continuing with the above example, a second sound file would begin playback at 34 seconds and play until 80 seconds. Meanwhile an image file would be displayed from 34 to 50 seconds with a location with the top x and top y coordinates being 10 and having a size of 320 pixels wide and 240 pixels high. At 51 seconds, another image is displayed until 70 seconds and a third image is displayed from 71 to 80 seconds. At 100 seconds, an image is displayed without accompanying music, until 117 seconds. Another image, again without music, is displayed at 118 to 125 seconds. At this point, the slideshow would end.

In this example, the image files were JPEG (Joint Picture Experts Group) files and the audio files were Sun Audio™ files, *.au. Any type of standardized image file format could be used, such as tagged image format (TIFF), graphics image format (GIF), bitmaps (BMP), etc. Similarly, any type of digital audio or media file could be used, such as MP3 files, Wave™ files, CD-Audio files, etc. While the file types generally refer to music, there is no requirement that the audio files contain music. The audio or media files could include sound effects, voice data such as a poetry reading, video clips, etc. No limitation on either the audio/media files or image files is intended by this specific example.

In this manner, users can create slideshows that can be played back on devices that do not have the extensive resources of a personal computer. Thus, although there has been described to this point a particular embodiment for a method and apparatus for a synchronized musical slideshow language, it is not intended that such specific references be considered as limitations upon the scope of this invention except in-so-far as set forth in the following claims.

What is claimed is:

1. The device comprising:
   a display screen;
   an audio output device; and
   a processor to execute a computer language adapted for providing different slideshow instructions, the instructions, comprising:
   at least one programmable body element of a slideshow, where the body element includes:
   a programmable master audio element that causes the processor to playback audio with and without synchronized image and associating any audio clip instructions in the same master audio element with any image clip instructions in the same master audio element,
   the master audio element defining the audio clip instructions for identifying an audio clip file name field associated with an audio clip file for playing out, an audio clipbegin field for programmably defining how far into a timeline for the defined audio clip file to start playing the audio clip, and a clipend field for programmably defining how far into the timeline of the audio clip file to stop playing the audio clip wherein the timeline is a time duration specifically for the audio clip file, the clipbegin field specifies at what time within the audio clip after a beginning time of the audio clip to start playing the audio clip and the clipend field specifies at what time within the audio clip prior to an ending time of the audio clip to stop playing the audio clip;

the master audio element also defining the image clip instructions for identifying an image clip file name field for identifying an image clip file for playing out, an image clipbegin field for programmably defining how far into a timeline for the image clip file to start playing the image clip, and a clipend field for programmably defining how far into the timeline of the image clip file to stop playing the image clip;

a separate master image element programmably categorizing a group of instructions for playback of images with a specified timing but independently from any audio clips, the master image element including instructions for identifying a programmable image clip file name field that programmably defines an associated image clip file for playing out by the processor, an image clipbegin field for programmably defining how far into a timeline for the image clip file to start playing the image clip, and a clipend field for programmably defining how far into the timeline of the image clip file to stop playing the image clip, the master audio element operable with the master image element so that the audio clip can be programmably operated in combination with one or more image clips and the master image element also operable independently of the master audio element so that one or more image clips can be programmably operated by themselves with no associated audio clip, wherein a XML computer language is used for specifying the master audio element and the master image element instructions that are then parsed by an XML parser to derive XML slideshow instructions executed by the processor; and wherein the XML instructions conform to the following Document Type Definition (DTD):

```
<!ELEMENT synchshow (head?, body?)>
<!ELEMENT head (metadata*)>
<!ELEMENT metadata EMPTY>
<!ATTLIST metadata
  name NMTOKEN #REQUIRED
  value CDATA #REQUIRED
>
<!ENTITY % mediaattributes"
  begin      CDATA #REQUIRED
  end        CDATA #REQUIRED
  src        CDATA #REQUIRED
  identifier CDATA #IMPLIED
">
<#ENTITY % clipattributes"
  clipbegin CDATA #IMPLIED
  clipend   CDATA #IMPLIED
">
<#ENTITY % graphicsattributes"
  topx   CDATA #IMPLIED
  topy   CDATA #IMPLIED
  width  CDATA #IMPLIED
  height CDATA #IMPLIED
">
<#ELEMENT body (masteraudio | maternone)*>
<#ELEMENT masternone (image)*>
<#ELEMENT masteraudio (image)*>
<#ATTLIST masteraudio
  %medianattributes; %clipattributes;
  endcue CDATA "longest"
<
<#ELEMENT image EMPTY>
<#ATTLIST image
  %mediaattributes; %graphicsattributes;
>.
```

2. A device, comprising:

a display screen;

an audio output device; and a processor to execute a computer language adapted for providing different slideshow instructions, the instructions, comprising:

at least one programmable body element of a slideshow, where the body element includes:

a programmable master audio element that causes the processor to playback audio with and without synchronized image and associating any audio clip instructions in the same master audio element with any image clip instructions in the same master audio element, the master audio element defining the audio clip instructions for identifying an audio clip file name field associated with an audio clip file for playing out, an audio clipbegin field for programmably defining how far into a timeline for the defined audio clip file to start playing the audio clip, and a clipend field for programmably defining how far into the timeline of the audio clip file to stop playing the audio clip wherein the timeline is a time duration specifically for the audio clip file, the clipbegin field specifies at what time within the audio clip after a beginning time of the audio clip to start playing the audio clip and the clipend field specifies at what time within the audio clip prior to an ending time of the audio clip to stop playing the audio clip;

the master audio element also defining the image clip instructions for identifying an image clip file name field for identifying an image clip file for playing out, an image clipbegin field for programmably defining how far into a timeline for the image clip file to start playing the image clip, and a clipend field for programmably defining how far into the timeline of the image clip file to stop playing the image clip;

a separate master image element programmably categorizing a group of instructions for playback of images with a specified timing but independently from any audio clips, the master image element including instructions for identifying a programmable image clip file name field that programmably defines an associated image clip file for playing out by the processor, an image clipbegin field for programmably defining how far into a timeline for the image clip file to start playing the image clip, and a clipend field for programmably defining how far into the timeline of the image clip file to stop playing the image clip, the master audio element operable with the master image element so that the audio clip can be pro grammably operated in combination with one or more image clips and the master image element also operable independently of the master audio element so that one or more image clips can be programmably operated by themselves with no associated audio clip;

wherein a XML computer language is used for specifying the master audio element and the master image element instructions that are then parsed by an XML parser to derive XML slideshow instructions executed by the processor; and wherein the XML instructions conform to the following XML Schema:

```
<?xml version="1.0" encoding=UTF-8"!>
<!--W3C Schema generated by XML Spy v4.3 U (http://www.xmlspy.com)-->
<xs:schema        xmlns:xs=http://www.w3.org/2001/XMLSchema"
  elementFormDefault="qualified">
```

```
<xs:element name="body">
  <xs:complexType>
    <xs:choice minOccurs="0" maxOccurs="unbounded">
      <xs:element ref="masteraudio"/>
      <xs:element ref="masternone"/>
    </xs:choice>
  </xs:complexType>
</xs:element>
<xs:element name="head">
  <xs:complexType>
    <xs:sequence>
      <xs:element ref="metadata" minOccurs="0" maxOccurs="unbounded"/>
    </xs:sequence>
  </xs:complexType>
</xs:element>
<xs:element name="image">
  <xs:complexType>
    <xs:attribute name="begin" type="xs:string" use="required"/>
    <xs:attribute name="end" type="xs:string" use="required"/>
    <xs:attribute name="src" type="xs:string" use="required"/>
    <xs:attribute name="identifier" type="xs:string"/>
    <xs:attribute name="topx" type="xs:string"/>
    <xs:attribute name="topy" type="xs:string"/>
    <xs:attribute name="width" type="xs:string"/>
    <xs:attribute name="height" type="xs:string"/>
  </xs:complexType>
</xs:element>
<xs:element name="masteraudio">
  <xs:complexType>
    <xs:sequence minOccurs="0" maxOccurs="unbounded">
      <xs:element ref="image"/>
    </xs:sequence>
    <xs:attribute name="begin" type="xs:string" use="required"/>
    <xs:attribute name="end" type="xs:string" use="required"/>
    <xs:attribute name="src" type="xs:string" use="required"/>
    <xs:attribute name="identifier" type="xs:string"/>
    <xs:attribute name="clipbegin" type="xs:string"/>
    <xs:attribute name="clipend" type="xs:string"/>
    <xs:attribute name="endcue" type="xs:string" default="longest"/>
  <xs:complexType
</xs:element>
<xs:element name="masternone">
  <xs:complexType>
    <xs:sequence MinOccurs="0" maxOccurs="unbounded">
      <xs:element ref="image"/>
    </xs:sequence>
  </xs:complexType>
</xs:element>
<xs:element name="metadata">
  <xs:complexType>
    <xs:attribute name="name" type="xs:NMTOKEN" use="required"/>
    <xs:atrribute name="value" type="xs:string" use="required"/>
  </xs:complexType>
</xs:element>
<xs:element name="synchshow">
  <xs:complexType>
    <xs:sequence>
      <xs:element ref="head" minOccurs="0"/>
      <xs:element ref="body" minOccurs="0"/>
    </xs:sequence>
  </xs:complexType>
</xs:element>.
```

\* \* \* \* \*

UNITED STATES PATENT AND TRADEMARK OFFICE
CERTIFICATE OF CORRECTION

PATENT NO.        : 7,272,779 B2                                    Page 1 of 2
APPLICATION NO. : 10/404795
DATED             : September 18, 2007
INVENTOR(S)      : Sachin Deshpande It is certified that error appears in the above-identified patent and that said Letters Patent is hereby corrected as shown below:

At column 9, line 46, please replace "identifierCDATA #IMPLIED" with --identifier CDATA #IMPLIED--
At column 9, line 48, please replace "<#ENTITY" with --<!ENTITY--
At column 9, line 51, please replace "<#ENTITY" with --<!ENTITY--
At column 9, line 57, please replace "<#ELEMENT body (masteraudio | maternone)*>" with --<!ELEMENT body (masteraudio | masternone)*>--
At column 9, line 58, please replace "<#ELEMENT" with --<!ELEMENT--
At column 9, line 59, please replace "<#ELEMENT" with --<!ELEMENT--
At column 9, line 60, please replace "<#ATTLIST" with --<!ATTLIST--
At column 9, line 61, please replace "%medianattributes" with --%mediaattributes--
At column 9, line 64, please replace "<#ELEMENT" with --<!ELEMENT--
At column 9, line 65, please replace "<#ATTLIST" with --<!ATTLIST--
At column 10, line 43, please replace "cliphegin field" with --clipbegin field--
At column 10, line 49, please replace "pro grammably" with --programmably--
At column 10, line 62, please replace "UTF-8"!>" with --UTF-8"?>--
At column 10, line 65, please replace "<xs:schema    xmlns:xs=http:" with --<xs:schema xmlns:xs="http:--
At column 11, line 3-4, please replace "<xs:choice    minOccurs="0"¶maxOccurs="unbounded">" with --<xs:choice minOccurs="0" maxOccurs="unbounded">--
At column 11, line 13, please replace "<xs:element    ref="metadata"" with --<xs:element ref="metadata"--
At column 11, line 20, please replace "<xs:attribute    name="begin" type="xs:string"" with --<xs:attribute name="begin" type="xs:string"--
At column 11, line 22, please replace "<xs:attribute    name="end"  type="xs:string"" with --<xs:attribute name="end" type="xs:string"--
At column 11, line 24, please replace "<xs: attribute    name="src"  type="xs:string"" with --<xs:attribute name="src" type="xs:string"--
At column 11, line 35, please replace "<xs:sequence   minOccurs="0"" with --<xs:sequence minOccurs="0"--
At column 11, line 39, please replace "<xs:attribute    name="begin" type="xs:string"" with --<xs:attribute name="begin" type="xs:string"--
At column 12, line 1, please replace "<xs:attribute    name="end"  type="xs:string"" with --<xs:attribute name="end" type="xs:string"--
At column 12, line 3, please replace "<xs:attribute    name="src"  type="xs:string"" with --<xs:attribute name="src" type="xs:string"--
At column 12, line 8, please replace "<xs:attribute    name="endcue" type="xs:string"" with --<xs:attribute name="endcue" type="xs:string"--
At column 12, line 10, please replace "<xs:complexType" with --<xs:complexType>--
At column 12, line 15, please replace "<xs:sequence   MinOccurs="0"" with --<xs:sequence MinOccurs="0"--

UNITED STATES PATENT AND TRADEMARK OFFICE
CERTIFICATE OF CORRECTION

PATENT NO. : 7,272,779 B2
APPLICATION NO. : 10/404795
DATED : September 18, 2007
INVENTOR(S) : Sachin Deshpande It is certified that error appears in the above-identified patent and that said Letters Patent is hereby corrected as shown below:

At column 12, line 26, please replace "<xs:attribute name="value" type="xs:string"" with --<xs:attribute name="value" type="xs:string"--
At column 12, line 37, please replace "</xs:element>." with
--</xs:element> ¶ </xs:schema>.--

Signed and Sealed this

Twenty-fifth Day of November, 2008

JON W. DUDAS
*Director of the United States Patent and Trademark Office*